United States Patent [19]

Murata et al.

[11] Patent Number: 5,252,683

[45] Date of Patent: Oct. 12, 1993

[54] COATING COMPOSITION FOR THE PREVENTION OF SCATTERING OF GLASS FRAGMENTS

[75] Inventors: Hiroshi Murata; Masami Oka, both of Ootsu; Hiroshi Fujimoto, Shiga, all of Japan

[73] Assignee: Toyo Boseki Kabushiki Kaisha, Osaka, Japan

[21] Appl. No.: 677,327

[22] Filed: Mar. 29, 1991

[30] Foreign Application Priority Data

Apr. 10, 1990 [JP] Japan ................................. 2-95942

[51] Int. Cl.$^5$ .................. C08G 18/06; C08G 18/42; B32B 27/18
[52] U.S. Cl. ................ 525/458; 428/423.1; 428/425.5; 428/425.6; 528/28; 528/80; 528/83; 528/85; 528/371; 528/372
[58] Field of Search .............. 528/371, 372, 83, 85, 528/28, 80; 525/458; 428/423.1, 425.5, 425.6

[56] References Cited

U.S. PATENT DOCUMENTS 4,631,206 12/1986 Mabuchi et al. .................... 528/59
4,808,691 2/1989 König et al. ....................... 528/372
4,826,952 5/1989 Kuyper et al. ..................... 528/371

FOREIGN PATENT DOCUMENTS 0107014  5/1984  European Pat. Off. .
0148329  7/1985  European Pat. Off. .
0140186  8/1985  European Pat. Off. .
21123841 2/1984  United Kingdom .
2216534 10/1989 United Kingdom .

*Primary Examiner*—John Kight, III
*Assistant Examiner*—John M. Cooney, Jr.
*Attorney, Agent, or Firm*—Wegner, Cantor, Mueller & Player

[57] ABSTRACT

A coating composition useful for shatter-proofing glass, capable of forming a film which allows an elongation of at least 400%. The coating composition includes (A) a polyurethane compound obtained by reaction of (a) a polycarbonate diol and/or (b) an aliphatic polyester diol, (c) an organic diisocyanate and (d) a chain extender possessing an active hydrogen-containing group in amounts to give an isocyanate group/active hydrogen-containing group equivalent ratio not exceeding 1.0, (B) an organic polyisocyanate compound and (C) a reactive silicone oil.

6 Claims, No Drawings

COATING COMPOSITION FOR THE PREVENTION OF SCATTERING OF GLASS FRAGMENTS

This invention relates to a coating composition. More particularly, this invention relates to a coating composition for shatterproofing glass, which exhibits an excellent effect in shatterproofing the glass such as of a fluorescent lamp in case of breakage of the glass and, at the same time, excels in light-fastness, heat-resisting property, and anti-blocking property.

At present, most fluorescent lamps are not furnished with a scatterproofing film, although some of the fluorescent lamps which are intended for business use do have such a film. These unprotected fluorescent lamps, therefore, have the possibility of being broken by various external causes or, on exposure to impacts of the shocks given thereto by family members removing or discarding them, sustaining breakage and consequently inflicting injuries to the family members. Now that safety is sought earnestly in every aspect of society, the prevention of accidents caused by scattered fragments of glass from broken fluorescent lamps constitutes itself an important task on the part of consumers and manufacturers as well.

With this background, part of the business-grade fluorescent lamps are furnished with a shatterproofing film. This fact infers a method for protecting a fluorescent lamp with a shrinkable polyester film. This method, however, have the disadvantages of (1) expensive raw material for the film, (2) inevitable change of the film with the tube diameter of the fluorescent lamp, and (3) exclusive applicability to the fluorescent lamps of straight-tube type and inapplicability to those of circular type. Thus, this method finds extensive utility only with difficulty.

For the solution of these disadvantages, the feasibility of a concept of forming a shatterproofing film on the surface of the glass of a fluorescent lamp by the coating technique has been being studied. None of the coating compositions developed to date proves suitable for the formation of a shatterproofing film by the coating technique.

This is because the characteristic properties required of the shatterproofing coating composition particularly suitable for use on fluorescent lamps pose a very steep technical barrier. To be specific, (1) the applied film of the coating composition is required to allow elongation of at least 400% to manifest the desired shatterproofing effect, (2) the film is required to avoid yellowing and suffering from serious impairment of tensile strength and elongation in spite of the ultraviolet light generated within the fluorescent lamp during its illumination, (3) the film is required to suffer from neither coloration nor impairment of tensile strength and elongation in spite of the heat from the electrodes of the lamp which are heated during the illumination of the lamp to an elevated temperature of from 100° to 120° C, and (4) the film is required to retain the inherent physical properties intact and avoid attracting dust and dirt. Because of the wellknown long service life of the fluorescent lamp ranging from 5,000 to 10,000 hours, the film is expected to offer durability commensurate to this service life of the lamp. Thus, the shatterproofing coating composition for use with the glass of the fluorescent lamp has unusually harsh physical properties to fulfil. None of the coating compositions developed to date is found to satisfy these characteristic properties.

In view of the problems mentioned above, the present inventors have found that a composition which combines a polyurethane compound obtained from a polycarbonate diol and/or an aliphatic polyester diol, an organic diisocyanate, and a chain extender possessing an active hydrogen-containing group with an organic polyisocyanate compound is most suitable and further that this composition, on further incorporation of a reactive silicone oil therein, enjoys a notable improvement in the blocking property to be manifested at elevated temperatures. The present invention has been perfected on the basis of this finding.

To be specific, this invention is directed to a shatterproofing coating composition for use on glass, essentially comprising 100 parts by weight of (A) a polyurethane compound obtained by the reaction of (a) a polycarbonate diol and/or (b) an aliphatic polyester diol, (c) an organic diisocyanate, and (d) a chain extender possessing an active hydrogen-containing group in amounts to give an isocyanate group/active hydrogen-containing group equivalent ratio not exceeding 1.0 and 0.5 to 40 parts by weight of (B) an organic polyisocyanate compound and optionally further comprising 0.1 to 10 parts by weight of (C) at least one reactive silicone oil selected from the group consisting of compounds represented by the following general formulas (I) to (VI).

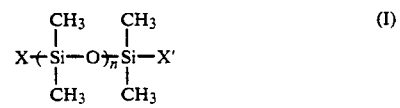

(wherein X and X' independently stand for OH group, —RNH$_2$ group, —RCOOH group, or —ROH group, R for an alkylene group of 1 to 20 carbon atoms, and $\geq 2$).

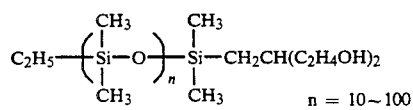

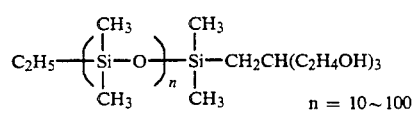

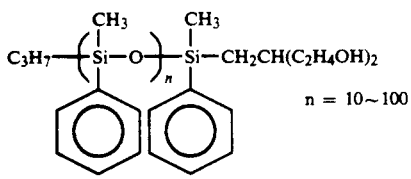

(IV)

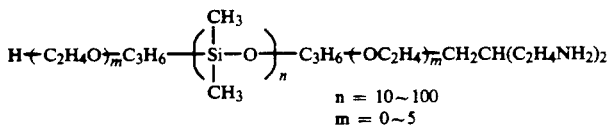

(V)

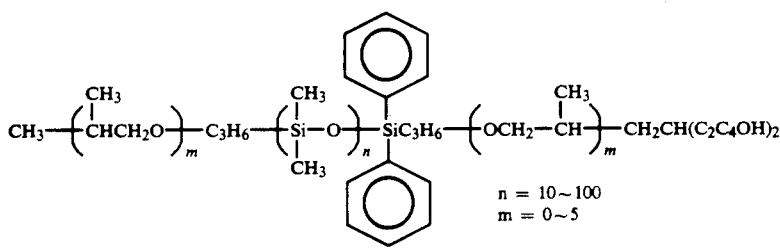

(VI)

-continued

The shatterproofing coating composition of this invention for use on glass comprises (A) a polyurethane compound, (B) an organic polyisocyanate compound, and optionally (C) a reactive silicone oil.

The (A) polyurethane compound to be used in this invention is obtained by the reaction of (a) a polycarbonate diol and/or (b) an aliphatic polyester diol, (c) an organic diisocyanate, and (d) a chain extender possessing an active hydrogen-containing group in amounts to give an isocyanate group/active hydrogen-containing group equivalent ratio not exceeding 1.0.

The polycarbonate diols which are effectively usable as the component (a) herein include ethylene polycarbonate diol, propylene polycarbonate diol, 1,4-butylene polycarbonate diol, 1,5-pentylene polycarbonate diol, 1,6-hexylene polycarbonate diol, 3-methyl-1,5-pentylene polycarbonate diol, and 1,9-nonylene polycarbonate diol, for example. Suitably, the number average molecular weight of such a polycarbonate diol is approximately from about 500 to about 3,000. These polycarbonate diols may be used either singly or jointly.

As (b) the aliphatic polyester diol, polyester diols obtained from aliphatic and/or alicyclic dicarboxylic acids and aliphatic glycols are usable. As aliphatic and alicyclic dicarboxylic acids, succinic acid, adipic acid, sebacic acid, azelaic acid, dodecadionic acid, hexahydrophthalic anhydride, and hexahydroterephthalic acid are cited, for example. As aliphatic glycols, ethylene glycol, propylene glycol, neopentyl glycol, butane diol, 1,6-hexane diol, 3-methyl-1,5-pentane diol, 1,9-nonane diol, cyclohexane dimethanol, hydrogenated bisphenol A or ethylene oxide thereof, and propylene oxide adducts are cited, for example. Such an aliphatic polyester diol may be copolymerized as with glycerin or trimethylol propane and consequently endowed with a branched configuration. Suitably, the number average molecular weight of (b) the aliphatic polyester diol to be used in this invention is approximately from about 500 to about 3,000.

For this invention, the use of (a) the polycarbonate diol and/or (b) the aliphatic polyester diol is an essential requirement. This invention is not accomplished by using the other diol component such as, for example, a polyether polyol like polyethylene glycol, polypropylene glycol, or polytetramethylene glycol or an aromatic polyester diol obtained from an aromatic dicarboxylic acid and a glycol.

In this invention, (a) the polycarbonate diol and (b) the aliphatic polyester diol are used either singly or jointly. In the joint use, the weight ratio of (a) the polycarbonate diol to (b) the aliphatic polyester diol is in the range of from 100 : 0 to 0 : 100, preferably from 100 : 0 to 30 : 70.

The organic diisocyanates which are effectively usable as the component (c) include aromatic diisocyanates such as tolylene diisocyanate, p-phenylene diisocyanate, m-phenylene diisocyanate, 4,4'-diphenyl methane diisocyanate, naphthalene diisocyanate and aliphatic or alicyclic diisocyanates such as hexamethylene diisocyanate, xylylene diisocyanate, hydrogenated xylylene diisocyanate, 4,4'-dicyclohexyl methane diisocyanate, and isophorone diisocyanate, for example. To accomplish the object of this invention which resides in shatterproofing the glass of a fluorescent lamp, the shatterproofing coating composition should exhibit high degrees of lightfastness and heat-resistance As the (c) organic diisocyanate compound, therefore, it is desirable to use an aliphatic or alicyclic diisocyanate.

The chain extenders possessing an active hydrogen-containing group which are effectively usable herein as the component (d) include glycols such as ethylene glycol, propylene glycol, 1,4-butane diol, 1,6-hexane diol, cyclohexane dimethanol, diethylene glycol, neopentyl glycol, and 3-methyl-1,5-pentane diol, amino alcohols such as monoethanol amine and N-methylol ethanol amine, diamines such as hexamethylene diamine, isophorone diamine, 4,4'-diaminodiphenyl methane, and diaminodiphenyl ether, and carboxyl group-containing glycols such as dimethylol propionic acid and tartaric acid, for example.

For the purpose of endowing (A) the polyurethane compound with a branched configuration, a polyhydric alcohol such as glycerin, trimethylol propane, or dipentaerythritol may be additionally used as a chain extender. The polyhydric alcohol is further effective in improving the anti-blocking property.

The (A) polyurethane compound to be used in this invention is synthesized by any of the known methods such as a method which comprises placing (a) a polycarbonate diol and/or (b) an aliphatic polyester diol, and (d) a chain extender possessing an active hydrogen-containing group in a suitable solvent inactive to an isocyanate group and then adding (c) an organic isocyanate thereto and allowing it to react with the diol at a temperature in the range of from 60° C. to 100° C. or a method which comprises allowing (a) a polycarbonate diol and/or (b) an aliphatic polyester diol to react in advance with (c) an organic diisocyanate in an excess of the equivalent weight and causing (d) a chain extender possessing an active hydrogen-group to react on the resultant reaction product. For the purpose of promoting the reaction of urethanization, a known reaction catalyst such as an amine or an organic tin compound may be used. In any event, it is essential that the equivalent ratio of [the isocyanate group of the component (c)]to [the active hydrogen-containing groups of the components (a)+(b)+(c)] should not exceed 1.0. If the proportion of the isocyanate group is excessive, the residual isocyanate group has the adverse effect of lowering the shelf life of the produced shatterproofing coating composition and lowering the reactivity of (A) the polyurethane compound with (B) the organic polyisocyanate compound which will be described specifically hereinbelow.

Suitably, (A) the polyurethane compound to be used in this invention possesses a reduced viscosity, $\eta sp/c$ (dl/g), in the range of 0.2 to 1.0, preferably 0.3 to 0.8. If the reduced viscosity is less than 0.2, the produced shatterproofing film fails to acquire sufficient elongation and exhibits a poor effect in shatterproofing glass. Conversely, if the reduced viscosity exceeds 1.0, the produced coating composition acquires an unduly high viscosity, fails to assume a high solids concentration, and exhibits poor adaptability for coating.

The shatterproofing coating composition of this invention for use on glass incorporates (B) an organic polyisocyanate compound as a cross-linking agent.

The organic polyisocyanate compounds which are effectively usable herein as the component (B) include biuret or isocyanurate trimers of known diisocyanates represented by aliphatic diisocyanates such as tetramethylene diisocyanate and hexamethylene diisocyanate and alicyclic diisocyanates such as isophorone diisocyanate, hydrogenated tolylene diisocyanate, hydrogenated xylylene diisocyanate, and hydrogenated diphenyl methane diisocyanate, adducts between 3 mols of diisocyanate compounds and 1 mol of trifunctional polyols, and blocked isocyanate compound having an isocyanate group blocked therein, for example. As the blocking agent for the isocyanate group, such known blocking agents as phenol, ε-caprolactam, ethyl acetacetate, and methylethyl ketoxime may be used. The amount of (c) the organic polyisocyanate compound to be incorporated is in the range of from 0.5 to 40 parts by weight, based on 100 parts by weight of (A) the polyurethane compound. If this amount is less than 0.5 part by weight, the incorporated compound manifests no sufficient cross-linking effect. If the amount exceeds 40 parts by weight, the excess of the incorporated compound only adds to the cost of raw material and brings about no increase in the effect.

The shatterproofing coating composition of this invention for use on glass practically wholly attains what it aims to accomplish virtually exclusively with (A) the aforementioned polyurethane compound and (B) the organic polyisocyanate compound. It has been ascertained to the inventors that this composition, on further incorporation of (C) the reactive silicone oil therein, enjoys a prominent improvement in the tackiness of surface and the anti-blocking property of the film at elevated temperatures. The shatterproofing coating composition of this invention for use on glass further incorporates therein, when necessary, (C) at least one silicone oil selected from the group consisting of the compounds represented by the following general formulas (I) to (VI).

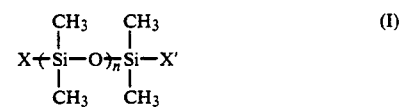

(wherein X and X' independently stand for OH group, —RNH₂ group, —RCOOH group, or —ROH group, R for an alkylene group of 1 to 20 carbon atoms, and $\geq 2$).

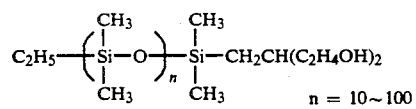

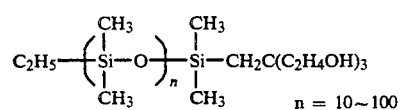

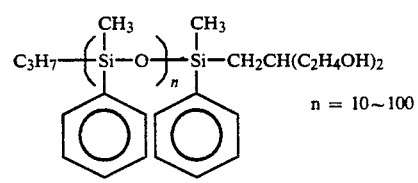

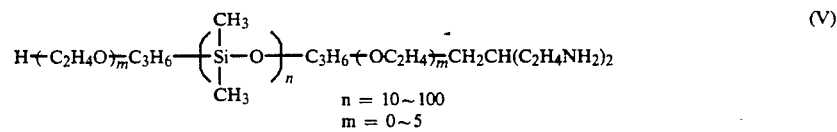

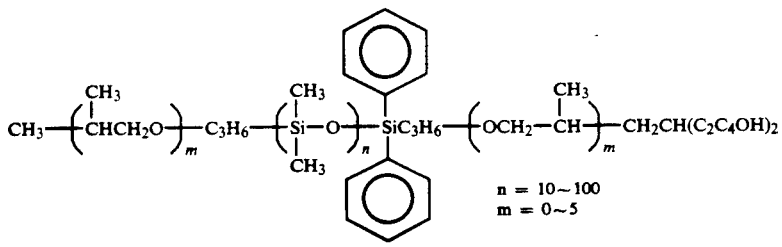

$$n = 10\sim100$$
$$m = 0\sim5$$

The incorporation of (C) the reactive silicone oil in the coating composition is effective in improving the tackiness of surface of the film and, therefore, is desirable for the purpose of preventing the film from attracting dust and dirt.

The reactive silicone oil which are usable for this incorporation include a silanol-modified silicone oils (the products of Nippon Unicar Co., Ltd. marketed under product codes of "L-9000" and Y-7005", for example), amino-modified silicone oils (the products of Nippon Unicar Co., Ltd. marketed under product codes of "AFL-40," "FZ-3705," and "FZ-3710," for example), carboxylmodified silicone oils (the product of Nippon Unicar Co., Ltd. marketed under product code of "FZ-3703," for example), and alcohol-modified silicone oils (the products of Nippon-Unicar Co., Ltd. marketed under product codes of "F-99-199" and "F-99-258," for example).

The amount of (C) the reactive silicone oil to be incorporated is in the range of from 0.1 to 10 parts by weight, based on 100 parts by weight of (A) the polyurethane compound. If this amount is less than 0.1 part by weight, it has no notable effect in improving the tackiness of surface. Conversely, if the amount exceeds 10 parts by weight, the applied film of the composition suffers from poor transparency because of opacification.

The shatterproofing coating composition of this invention for use on glass is generally put to use as dissolved in a solvent. The solvents which are effectively usable herein include ketone type solvents such as acetone, methylethyl ketone, methylisobutyl ketone, and cyclohexanone, aromatic hydrocarbons such as toluene, xylene, Solvesso #100, and solvesso #150, alcohol type solvents such as ethyl cellosolve, butyl cellosolve, ethyl carbitol, propanol, and butanol, and ester type solvents such as ethyl acetate, butyl acetate, ethyl cellosolve acetate, and butyl cellosolve acetate, for example.

The shatterproofing coating composition of this invention for use on glass may incorporate therein additives and modifiers such as, for example, antioxidant, ultraviolet absorbent, surface-smoothing agent, defoaming agent, thixotropic agent, and coloring agent.

The method to be employed for coating glass with the shatter-proofing coating composition of this invention is not particularly limited. Any of the known methods such as roll coating, spray coating, and dip coating may be used. The layer of the composition applied to the glass is generally dried and hardened at a temperature in the range of from 80° C. to 150° C. for a period in of from 5 minutes to 180 minutes.

The shatterproofing coating composition of this invention for use on glass excels not only in the shatterproofing effect manifested on glass butalso in lightfastness, heat-resistance, and anti-blocking property. It can be used as a coating agent and an adhesive agent not merely on the fluorescent lamp but also on substrates of glass, metals, and plastics.

Examples

For more specific illustration of the present invention, the following examples are presented which are intended to be merely illustrative or and not in any sense limitative of the invention.

Synthesis 1:

In a reaction vessel provided with a stirrer and a cooling tube, 65 parts by weight of butyl acetate, 100 parts by weight of 1,6-hexane polycarbonate diol (molecular weight 2,000), 52 parts by weight of isophorone diisocyanate, and 0.1 part by weight of dibutyl tin dilaurate were placed and stirred at 100° C. for one hour to effect reaction. Then, the resultant reaction mixture and 50 parts by weight of butyl acetate and 20 parts by weight of neopentyl glycol added thereto were left to react at 100° C. for three hours. After this reaction, the reaction product was diluted with 204 parts by weight of butyl acetate to a solids concentration of 35% by weight. The polyurethane solution (a) thus obtained possessed a viscosity of 22 poises and the polyurethane compound possessed a reduced viscosity, $\eta$ sp/c, of 0.69 (dl/g). For determination of the reduced viscosity, $\eta$ sp/c, a solution of 0.1 g of this polyurethane compound in 25 cc of a mixed solvent of phenol/tetrachloroethane (volume ratio of 6/4) was subjected to the measurement at 30° C. In the reaction mentioned above, the isocyanate group/active hydrogen-containing group (OH group) equivalent ratio was 1.0/1.03.

Synthesis 2:

In the same reaction vessel as used in Synthesis 1, 65 parts by weight of butyl acetate, 100 parts by weight of hexylene polycarbonate diol (molecular weight 2,000), 49 parts by weight of isophorone diisocyanate, and 0.1 part by weight of dibutyl tin dilaurate were placed and stirred at 100° C. for one hour to effect reaction. The resultant reaction mixture and 50 parts by weight of butyl acetate, 20 parts by weight of neopentyl glycol, and 1 part by weight of trimethylol propane added thereto were left react at 100° C. for three hours. After the reaction, the reaction product was diluted with 140 parts of butyl acetate to a solids concentration of 40% by weight. The polyurethane solution (b) thus obtained possessed a viscosity of 7 poises (25° C.) and the polyurethane compound possessed a reduced viscosity of 0.39. In the reaction mentioned above, the isocyanate group/active hydrogencontaining group (OH group) equivalent ratio was 1.0/1.13.

Synthesis 3:

In the same reaction vessel in synthesis 1, 65 parts by weight of butyl acetate, 50 parts by weight of hexylene polycarboante diol (molecular weight 2,000), 50 parts by weight of neopentyl adipate (molecular weight 2,000) as a polyester diol, 49 parts by weight of isophorone diisocyanate, and 0.1 part by weight of dibutyl tin dilaurate were placed and stirred at 100° C. for one hour to effect reaction. The resultant reaction mixture and 50 parts by weight of butyl acetate and 20 parts by weight of neopentyl glycol added thereto were left reacting at 100° C. for three hours. After the reaction, the reaction product was diluted with 139 parts by butyl acetate to a solids concentration of 40% by weight. The polyurethane solution (c) consequently obtained possessed a viscosity of 6 poises (25° C.) and the polyurethane compound possessed a reduced viscosity, $\eta sp/c$, of 0.40. In the reaction mentioned above, the isocyanate group/active hydrogen-containing group (OH group) equivalent ratio was 1.0/1.1.

Synthesis 4:

In the same reaction vessel as used in Synthesis 1, 55 parts by weight of butyl acetate, 50 parts by weight of an aromatic polyester diol [terephthalic acid/isophthalic acid//ethylene glycol/neopentyl glycol = 50/50//50/50 (molar ratio), molecular weight 2,000], 50 parts by weight of neopentylene adipate (molecular weight 2,000) as an aliphatic polyester diol, 29 parts by weight of isophorone diisocyanate, and 0.1 part by weight of dibutyl tin dilaurate were placed and stirred at 100° C. for one hour to effect reaction. Then, the resultant reaction mixture and 40 parts by weight of butyl acetate and 10 parts by weight of neopentyl glycol added thereto were left reacting at 100° C. for three hours. After the reaction, the reaction product was diluted with 114 parts by weight of butyl acetate to a solids concentration of 40% by weight. The polyurethane solution (d) consequently obtained possessed a viscosity of 2 poises (25° C.) and the polyurethane compound possessed a reduced viscosity, $\eta sp/c$, of In the reaction mentioned above, the isocyanate group/active hydrogen-containing group (OH group) equivalent ratio was 1.0/1.12.

Synthesis 5:

In a reaction vessel provided with a stirrer and a cooling tube, 65 parts by weight of butyl acetate, 100 parts by weight of 1,6-hexylene polycarbonate diol (molecular weight 2,000), 15 parts by weight of neopentyl glycol, and 5 parts by weight of trimethylol propane, were mixed and dissolved. The resultant reaction mixture and 40 parts by weight of isophorone diisocyanate and 0.1 part by weight of dibutyl tin dilaurate added thereto were left to react at 100° C for four hours. The reaction product thus obtained was diluted with 175 parts by weight of butyl acetate to a solids concentration of 40% by weight. The polyurethane solution (c) consequently obtained possessed a viscosity of 1.6 poises (25° C) and the polyurethane compound possessed a reduced viscosity, $\eta sp/c$, of 0.30 (dl/g). In the reaction mentioned above, the isocyanate group/active hydrogen-containing group (OH group) equivalent ratio was 1.0/1.1.

Example 1

A coating composition (i) of this invention was obtained by combining 100 parts by weight of (a) the polyurethane solution obtained in Synthesis 1 and 0.83 part by weight of a timer of isophorone diisocyanate (produced by Daicel Hüls K.K. and marketed under trademark designation of "Isocyanate T-1890") as an organic polyisocyanate. A hard film produced from this coating composition (i) was tested for physical properties. The film of the same composition applied to a fluorescent lamp was evaluated as to its effect manifested in shatterproofing the glass of the lamp.

Method of evaluation (1) Preparation of coating film

A hard coating film was produced by applying the produced composition (i) with a bar coater on a polypropylene film in an amount calculated to give a dry layer about 50 $\mu$m in thickness and drying and hardening the applied layer first at 80° C. for five minutes and then at 120° C. for 30 minutes.

(2) Determination of tensile elongation

By the use of a Tensilon tensile tester, the coating film was tested for tensile properties under the conditions of 20° C. in temperature and 50 mm/min in stretching speed. (3) Evaluation of heat-resistance This property was determined by heating the coating film in the open air at 120° C. for 240 hours and measuring the color assumed consequently by the film with the aid of a color difference meter.

(4) Evaluation

This property was determined by irradiating the coating film with an ultraviolet light (290 m$\mu$ Max) by the use of a Q-UV accelerated weather tester and measuring the color assumed consequently by the film with a color difference meter.

(5) Evaluation of anti-blocking property of film

This property was determined by superposing two sheets of the coating film, heating the superposed sheets under a load of 200 g/cm$^2$ at 40° C. and 120° C. for two hours, and evaluating the superposed sheets as to the blocking property.

(6) Shatterproofing effect manifested on glass

This property was determined by applying the coating composition of this invention by the dipping method on the glass tube part of a circular type 30-w fluorescent lamp in an amount calculated to give a dry layer about 60 to 70 $\mu$m in hardening the applied layer of the composition at 120° C. for three hours, dropping a steel ball 200 g in weight from a height of 30 cm onto the fluorescent lamp coated with the film, and visually examining the scattering condition of fragments of glass from the broken lamp. The results are shown in Table 1.

Examples 2 and 3 and Comparative Examples

Varying coating compositions were prepared from polyurethane solutions (b) and (c) obtained by following the procedure of Example 1 and these coating compositions were evaluated similarly. The results are shown in Table 1. For comparison, a polyurethane solution (d) was similarly processed and tested. The results are also shown in Table 1.

It is clearly noted from Table 1 that the coating compositions conforming to this invention excelled not only in the shatterproofing effect manifested on glass but also in lightfastness and heat-resisting property.

TABLE 1

|  | Composition | | | |
|---|---|---|---|---|
|  | Example 1 (i) | Example 2 (ii) | Example 3 (iii) | Comparative Example (iv) |
| Kind of polyurethane solution | a | b | c | d |
| Amount incorporated (parts by weight) | 100 | 100 | 100 | 100 |
| (Solids content, parts by weight) | (35) | (40) | (40) | (40) |
| Organic polyisocyanate compound | T-1890 | T-1890 | T-1890 | T-1890 |
| Amount incorporated (parts by weight) | 0.83 | 3.5 | 2.4 | 2.4 |
| Tensile elongation | 620 | 450 | 580 | 380 |
| Initial coloration (b value) | 0.81 | 0.89 | 0.83 | 0.92 |
| Heat-resistance after 300 hrs' standing at 120° C. (b value) | 0.83 | 0.89 | 0.86 | 2.01 |
| Lightfastness after 96 hrs' exposure to Q.UV (b value) | 0.84 | 0.91 | 0.87 | 2.51 |
| Anti-blocking property 40° C. × 2 hrs | o | o | o | o |
| 120° C. × 2 hrs | x | x | x | x |
| Shatterproofing effect Initial | 5 | 5 | 5 | 4 |
| (Note) After 500 hrs' illumination | 5 | 5 | 4 | 2 |

(Note)
Shatterproofing effect: Evaluated on the 5-point scale (5 for best effect) by observation of degree of scattering caused.

Examples 4 to 11

A coating composition (v) of this invention was obtained by combining 100 parts by weight of the polyurethane solution (a) obtained in synthesis 1, 0.5 part by weight of a reactive silicone oil (produced by Nippon Unicar Co., Ltd. and marketed under product code of "F-99.199"), and 4.4 parts by weight of a timer of isophorone diisocyanate (produced by Daicel Hüls K.K. and marketed under trademark designation of "Isocyanate T-1890") as an organic polyisocyanate. Similarly, various coating compositions (vi) to (xii) were prepared. The hard films produced from the coating composition were tested for physical properties and coating films applied to fluorescent lamps were evaluated as to shatterproofing effect manifested on glass. The results are shown in Table 2.

It is clearly noted from Table 2 that the incorporation of a reactive silicone oil was very effective in improving the antiblocking property at elevated temperatures.

EXAMPLE 12

A coating composition (xiii) of this invention was obtained by combining 100 parts by weight of the polyurethane solution (e) obtained in Example 4, 0.2 part by weight of a reactive silicon oil (produced by Nippon Unicar Co., Ltd. and marketed under product code of "F-99-199"), 10.6 parts by weight of a block of isophorone diisocyanate compound (marketed under product code of LPDI-1358) as an organic polyisocyanate compound 0.7 part by weight of a defoaming agent, and 0.05 part by weight of dibutyl tin dilaurate. A hard film produced from the coating composition (xiii) was tested for physical properties and a coating film applied to a fluorescent lamp was evaluated as to shatterproofing effect manifested on glass in the same manner as in Example 1. The results are shown in Table 3 below.

TABLE 3

| Item | Physical constant |
|---|---|
| Tensile elongation (%) | 420 |
| Initial coloration (b value) | 0.90 |
| Heat-resistance after 300 hrs' standing at 120° C. (b value) | 0.91 |
| Lightfastness after 96 hrs' exposure to Q.UV (b value) | 0.93 |

TABLE 2

|  |  | Example | | | | | | | |
|---|---|---|---|---|---|---|---|---|---|
|  |  | 4 | 5 | 6 | 7 | 8 | 9 | 10 | 11 |
|  |  | Composition | | | | | | | |
|  |  | v | vi | vii | viii | ix | x | xi | xii |
| Kind of polyurethane solution |  | a | a | a | b | b | b | c | c |
| Amount incorporated (parts by weight) |  | 100 | 100 | 100 | 100 | 100 | 100 | 100 | 100 |
| (Solids content, parts by weight) |  | (35) | (35) | (35) | (40) | (40) | (40) | (40) | (40) |
| Kind of reactive silicone oil* |  |  |  |  |  |  |  |  |  |
| Amount incorporated (parts by weight) |  | 0.3 | 0.5 | 0.5 | 0.4 | 0.6 | 0.4 | 0.4 | 0.6 |
| Organic polyisocyanate compound |  |  |  |  |  |  |  |  |  |
| Amount incorporated (parts by weight) |  | 4.4 | 0.83 | 0.83 | 3.5 | 3.5 | 2.4 | 2.4 | 1.6 |
| Tensile elongation (%) |  | 620 | 600 | 610 | 450 | 430 | 450 | 580 | 590 |
| Initial coloration (b value) |  | 0.18 | 0.85 | 0.85 | 0.89 | 0.90 | 0.92 | 0.83 | 0.83 |
| Heat-resistance after 300 hrs' standing at 120° C. (b value) |  | 0.83 | 0.87 | 0.86 | 0.89 | 0.92 | 0.93 | 0.86 | 0.85 |
| Lightfastness after 96 hrs' exposure to Q.UV (b value) |  | 0.84 | 0.87 | 0.86 | 0.91 | 0.94 | 0.94 | 0.87 | 0.89 |
| Anti-blocking property | 40° C. | o | o | o | o | o | o | o | o |
|  | 120° C. | o | o | o | o - | o | o | o | o |
| Shatterproofing effect | Initial | 5 | 5 | 5 | 5 | 5 | 5 | 5 | 5 |
| (Note) | After 500 hrs' illumination | 5 | 5 | 5 | 5 | 5 | 5 | 5 | 4 |

*Reactive silicone produced by Nippon Unicar Co., Ltd.
(Note):
The evaluation was done in the same manner as for Table 1.

TABLE 3-continued

| Item | | Physical constant |
|---|---|---|
| Anti-blocking property | 40° C. | 0 |
| | 120° C. | 0 |
| Shatterproofing effect | Initial | 5 |
| | After 500 hrs' illumination | 5 |

The shatterproofing coating composition of this invention for use on glass uses a polyurethane compound obtained from a polycarbonate diol and/or an aliphatic diol and an organic isocyanate compound and further incorporates therein a reactive silicone oil. It, therefore, enjoys the following advantages:

1) It possesses ample elongation for the manifestation of the shatterproofing effect on glass and, at the same time, enjoys stability to resist the ultraviolet light and the heat generated inside the fluorescent lamp and avoids yielding to impairment of physical properties or yellowing.

2) It excels in transparency and in freedom from the phenomenon of blocking and, therefore, avoids attracting dust.

3) It allows a notable drop in cost as compared with the coating produced from the conventional thermally shrinkable film.

It can be used extensively as a coating composition for substrates of plastic and metallic materials besides as a shatter-proofing composition on the glass of a fluorescent lamp.

We claim:

1. A shatterproofing coating composition for use on glass, comprising 100 parts by weight of (A) a polyurethane compound obtained by the reaction of (a) a polycarbonate diol not containing polyetherpolyol and/or (b) an aliphatic polyester diol, (c) an organic diisocyanate, and (d) a chain extender possessing an active hydrogen-containing group in amounts to give an isocyanate group/active hydrogen-containing group equivalent ratio not exceeding 1.0, 0.5 to 40 parts by weight of (B) an organic polyisocyanate compound per 100 parts by weight of the polyurethane compound (A), and (C) 0.1-10 parts by weight of a reactive silicone oil per 100 parts by weight of the polyurethane compound (A), the coating composition being capable of forming a film which allows an elongation of at least 400%

2. A shatterproofing coating composition for use on glass, comprising 100 parts by weight of (A) a polyurethane compound obtained by the reaction of (a) a polycarbonate diol and/or (b) an aliphatic polyester diol, (c) an organic diisocyanate, and (d) a chain extender possessing an active hydrogen-containing group in amounts to give an isocyanate group/active hydrogen-containing group equivalent ratio not exceeding, 1.0, 0.5 to 40 parts by weight of (B) an organic polyisocyanate compound, and 0.1 to 10 parts by weight of (C) at least one reactive silicone oil selected from the group of compounds represented by the following general formula (I) to (VI).

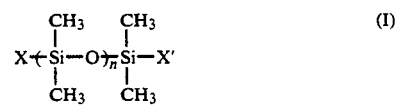

(wherein X and X' independently stand for OH group, —RNH$_2$ group, —RCOOH group, or —ROH group, R for an alkylene group of 1 to 20 carbon atoms, and $\geq 2$)

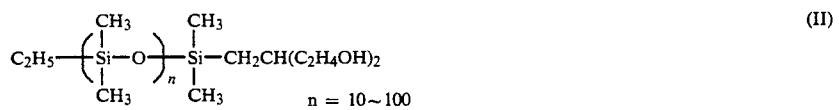

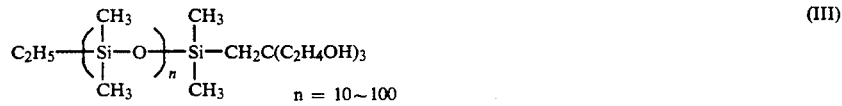

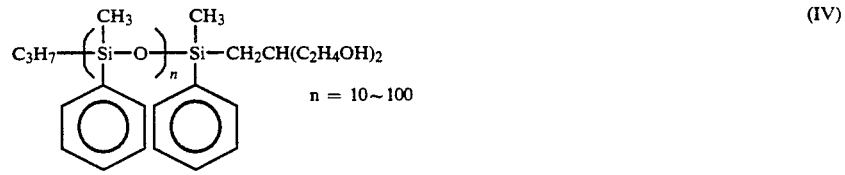

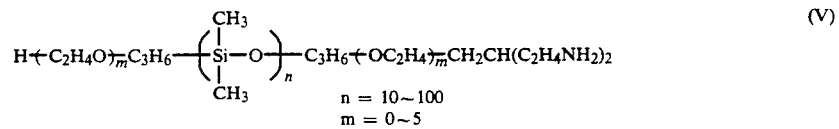

-continued

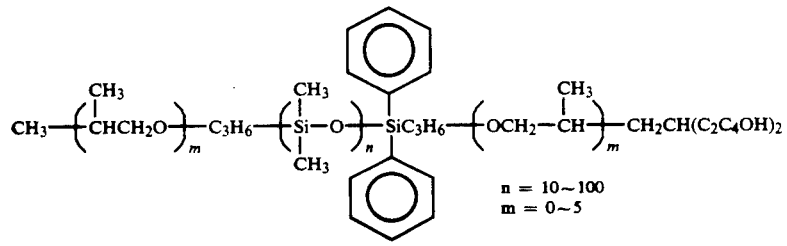

(VI)

n = 10~100
m = 0~5

3. The composition of claim 1, further comprising a solvent selected from the group consisting of ketone type solvents, aromatic hydrocarbons, alcohol type solvents and ester type solvents.

4. The composition of claim 2, further comprising a solvent selected from the group consisting of ketone type solvents, aromatic hydrocarbons, alcohol type solvents and ester type solvents.

5. A glass article subject to shattering, having a surface which is coated with a composition of claim 1.

6. A glass article subject to shattering, having a surface which is coated with a composition of claim 2.

* * * * *